(12) United States Patent
Higuchi et al.

(10) Patent No.: US 8,532,049 B2
(45) Date of Patent: Sep. 10, 2013

(54) RADIO BASE STATION, USER DEVICE, AND METHOD USED IN MOBILE COMMUNICATION SYSTEM

(75) Inventors: Kenichi Higuchi, Yokohama (JP); Yoshihisa Kishiyama, Yokosuka (JP); Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 1022 days.

(21) Appl. No.: 12/377,689

(22) PCT Filed: Aug. 17, 2007

(86) PCT No.: PCT/JP2007/066047
§ 371 (c)(1),
(2), (4) Date: Apr. 30, 2009

(87) PCT Pub. No.: WO2008/023644
PCT Pub. Date: Feb. 28, 2008

(65) Prior Publication Data
US 2009/0245190 A1    Oct. 1, 2009

(30) Foreign Application Priority Data

Aug. 22, 2006   (JP) .................................. 2006-225926

(51) Int. Cl.
*H04W 4/00*        (2009.01)
*H04B 7/00*        (2006.01)
(52) U.S. Cl.
USPC .......................................... 370/330; 455/231
(58) Field of Classification Search
USPC ....................................................... 370/330
See application file for complete search history.

(56) References Cited

U.S. PATENT DOCUMENTS

| | | | | |
|---|---|---|---|---|
| 6,115,390 A | * | 9/2000 | Chuah | 370/443 |
| 6,141,336 A | * | 10/2000 | Bauchot et al. | 370/348 |
| 6,917,607 B1 | * | 7/2005 | Yeom et al. | 370/342 |
| 7,936,741 B2 | * | 5/2011 | Vimpari et al. | 370/342 |
| 2002/0137533 A1 | * | 9/2002 | Struhsaker et al. | 455/502 |
| 2002/0141367 A1 | * | 10/2002 | Hwang et al. | 370/335 |
| 2002/0159417 A1 | * | 10/2002 | Panasik et al. | 370/337 |
| 2003/0003920 A1 | * | 1/2003 | Sebastian | 455/452 |

(Continued)

FOREIGN PATENT DOCUMENTS

| | | |
|---|---|---|
| JP | 2002-027535 A | 1/2002 |
| JP | 2005-286753 A | 10/2005 |

(Continued)

OTHER PUBLICATIONS

Japanese Office Action for Application No. 2006-225926, mailed on Nov. 16, 2010 (5 pages).

(Continued)

*Primary Examiner* — Guang Li
(74) *Attorney, Agent, or Firm* — Osha Liang LLP

(57) ABSTRACT

A radio base station used in a mobile communication system is disclosed. The radio base station includes a scheduler configured to allocate one or more resource blocks, which are defined by a predetermined bandwidth and a predetermined transmission time interval, to a user device; and a reporting unit configured to report scheduling information indicating radio resource allocation to the user device. The scheduler is configured to generate the scheduling information such that downlink data channels and downlink control channels are transmitted using the transmission time interval as a transmission unit and uplink control channels are transmitted using an integral multiple of the transmission time interval as a transmission unit.

17 Claims, 17 Drawing Sheets

(56) References Cited

U.S. PATENT DOCUMENTS

| | | | |
|---|---|---|---|
| 2003/0091019 A1* | 5/2003 | Takano | 370/345 |
| 2003/0123396 A1* | 7/2003 | Seo et al. | 370/252 |
| 2003/0214928 A1* | 11/2003 | Chuah | 370/336 |
| 2005/0152303 A1* | 7/2005 | Li et al. | 370/328 |
| 2007/0030839 A1* | 2/2007 | Vimpari et al. | 370/342 |
| 2007/0047452 A1* | 3/2007 | Lohr et al. | 370/242 |
| 2007/0047474 A1* | 3/2007 | Anderson | 370/277 |
| 2007/0047485 A1* | 3/2007 | Gorokhov et al. | 370/329 |
| 2007/0104151 A1* | 5/2007 | Papasakellariou et al. | 370/335 |
| 2008/0020779 A1* | 1/2008 | Ode et al. | 455/450 |
| 2008/0043681 A1* | 2/2008 | Vimpari et al. | 370/335 |
| 2008/0123542 A1* | 5/2008 | Karlsson | 370/252 |
| 2009/0279505 A1* | 11/2009 | Baek et al. | 370/331 |

FOREIGN PATENT DOCUMENTS

| | | |
|---|---|---|
| JP | 2006-033778 A | 2/2006 |
| JP | 2006-135985 A | 5/2006 |
| JP | 2006-157618 A | 6/2006 |
| TW | I240519 B | 9/2005 |
| WO | 2006038078 A2 | 4/2006 |

OTHER PUBLICATIONS

Patent Abstracts of Japan for Japanese Publication No. 2002-027535, publication date Jan. 25, 2002 (1 page).
Patent Abstracts of Japan for Japanese Publication No. 2006-157618, publication date Jun. 15, 2006 (1 page).
International Search Report w/translation from PCT/JP2007/066047 dated Oct. 2, 2007 (3 pages).
Written Opinion from PCT/JP2007/066047 dated Oct. 2, 2007 (3 pages).
3GPP TR 25.896, V6.0.0, "Feasibility Study for Enhanced Uplink for UTRA FDD"; Mar. 2004; pp. 37-38 (2 pages).
Taiwanese Office Action for Application No. 096130871, mailed on May 10, 2011 (7 pages).
esp@cenet Patent Abstract for Taiwanese Publication No. I240519, publication date Sep. 21, 2005. (1 page).

* cited by examiner

RADIO BASE STATION, USER DEVICE, AND METHOD USED IN MOBILE COMMUNICATION SYSTEM

TECHNICAL FIELD

The present invention generally relates to a radio base station, a user device, and a method used in a mobile communication system.

BACKGROUND ART

In the field of mobile communication, research and development of next generation mobile communication systems are being conducted at a rapid pace. In such mobile communication systems, signals are transmitted as packets in unit transmission periods called transmission time intervals (TTIs). The transmission time interval (TTI) may also be called a time period or a subframe. The TTI is used as a base unit of various types of signal processing such as radio resource allocation, channel coding, and retransmission.

Meanwhile, a period of time from when a data channel including user data is transmitted from a sending end to a receiving end where the data channel is demodulated and decoded until when the sending end receives delivery confirmation information (acknowledge or negative acknowledge) from the receiving end is called a control delay or a round-trip delay. For a real-time application (such as a multiplayer game) or to increase transmission control protocol (TCP) throughput, it is preferable to use a short TTI and thereby to reduce the control delay.

On the other hand, as described below, it is preferable to use a long TTI to increase the area of a cell in a mobile communication system where, in uplink communications, a base station receives relatively high power from a user device near the base station but receives relatively low power from a user device at a cell edge.

FIG. 1 shows packets with short and long TTIs. Both the short TTI packet (left) and the long TTI packet (right) include a control channel labeled as "Control" in FIG. 1. The short TTI packet also includes a data channel labeled as "Data". The long TTI packet also includes data channels labeled as "Data 1" and "Data 2". The two portions labeled as "Control" in the long TTI packet include the same control channel. This means that the long TTI packet can use a higher level of power for a control channel than the short TTI packet. Accordingly, to increase the area of a cell, it is preferable to use a long TTI and thereby to improve the quality of uplink signals (particularly, control channels). The data channels "Data 1" and "Data 2" in the long TTI packet contain different information but are encoded by the same coding scheme since they belong to the same TTI. Unlike data channels, it is difficult to improve the quality of control channels by techniques such as retransmission control and adaptive modulation and coding (AMC). Therefore, transmission power and TTI are important parameters for improving the quality of control channels.

Thus, it is preferable to determine the length of TTI depending on communication environments and purposes. For example, TR-25.896 V6.0.0 2004-03 Feasibility Study for Enhanced Uplink for UTRA FDD (Section 8.2) proposes a method where an appropriate TTI is selected from a set of predefined TTIs with different lengths in a mobile communication system.

DISCLOSURE OF INVENTION

Problems to be Solved by the Invention

As described above, the length of TTI is a basic parameter in various types of signal processing. Therefore, when using multiple TTIs with different lengths, it is necessary to make sure that various types of signal processing can be properly performed with each of the multiple TTIs. However, this in turn complicates the configurations of devices (particularly, user devices) and signal processing and also complicates testing processes of the devices.

One object of the present invention is to prevent or at least reduce the complication of communication device configurations, signal processing, and product testing processes that may occur due to the use of multiple TTIs.

Means for Solving the Problems

An aspect of the present invention provides a radio base station used in a mobile communication system. The radio base station includes a scheduler configured to allocate one or more resource blocks, which are defined by a predetermined bandwidth and a predetermined transmission time interval, to a user device; and a reporting unit configured to report scheduling information indicating radio resource allocation to the user device. The scheduler is configured to generate the scheduling information such that downlink data channels and downlink control channels are transmitted using the transmission time interval as a transmission unit and uplink control channels are transmitted using an integral multiple of the transmission time interval as a transmission unit.

Advantageous Effect of the Invention

An aspect of the present invention makes it possible to prevent or at least reduce the complication of communication device configurations, signal processing, and product testing processes that may occur due to the use of multiple TTIs.

EXPLANATION OF REFERENCES

Figure 1:
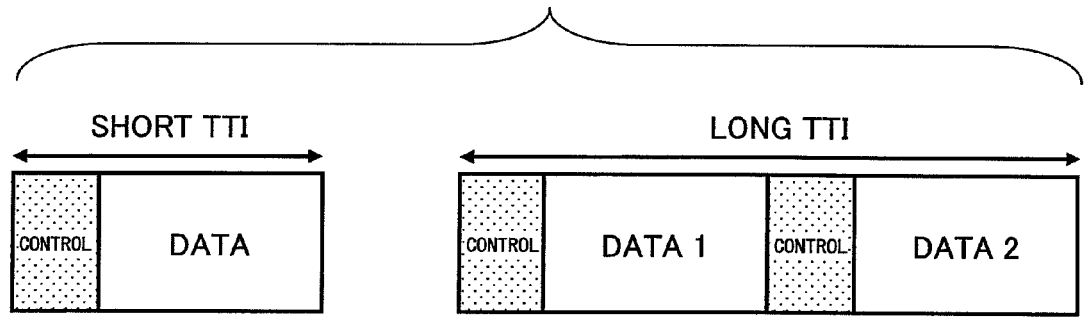
FIG. 1 is a drawing showing packets with short and long TTIs.

32 Downlink resource allocation unit
34 Coverage determining unit
36 Uplink L1/L2 control channel transmission cycle control unit
38 Downlink signal generating unit
382 Shared data channel generating unit
384 L1/L2 control channel generating unit
72 Uplink resource allocation unit
722 Uplink L1/L2 control channel allocation unit
724 Uplink data channel allocation unit
74 Coverage determining unit
91 Downlink L1/L2 control channel demodulation unit
92 Downlink upper layer signal demodulation unit
93 Uplink L1/L2 control channel generating unit
94 Downlink common pilot channel received power measuring unit
95 Path loss estimation unit
96 Desired transmission cycle determining unit
97 Uplink shared data channel generating unit
98 Multiplexing unit

BEST MODE FOR CARRYING OUT THE INVENTION

A mobile communication system according to an embodiment of the present invention is described below.

Figure 2:
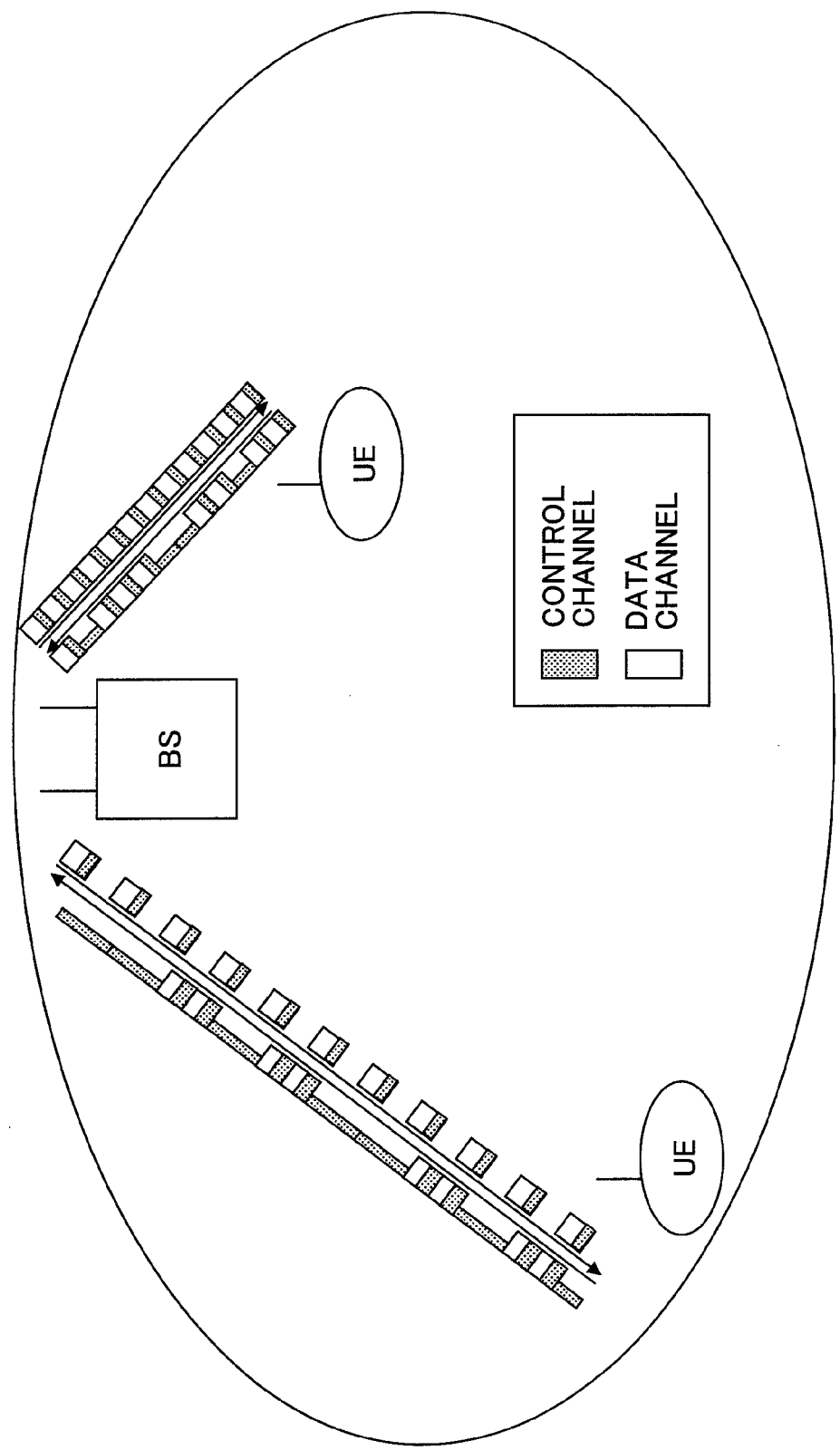
FIG. 2 is a drawing illustrating a mobile communication system according to an embodiment of the present invention.

FIG. 2 shows a mobile communication system according to an embodiment of the present invention. The mobile communication system includes a base station (BS) and user devices (UE). In the mobile communication system, uplink control channels are transmitted using an integral multiple of a transmission time interval (TTI×n) as a transmission unit. Here, "n" indicates an integer greater than or equal to 1. In other words, "TTI×n" is used as a resource allocation unit. Uplink data channels from user devices are transmitted using one TTI as a transmission unit regardless of whether the user devices are close to or far away from the base station.

Downlink data channels and downlink control channels are transmitted to user devices using one TTI as a transmission unit regardless of whether the user devices are close to or far away from the base station. In other words, one TTI is used as a resource allocation unit. However, because uplink control channels from user devices away from the base station are transmitted using two TTIs as a transmission unit, downlink data channels to the user devices are transmitted at a transmission cycle of two TTIs. In other words, the transmission cycle of downlink data channels is set at a value longer than the transmission cycle of uplink control channels (ACK/NACK in response to the downlink data channels).

To improve the transmission (data) rate of downlink data channels, it is preferable to allocate as many resource blocks as possible to the downlink data channels in one TTI. This is because ACK/NACK is reported to the base station only once for the downlink data channels transmitted in each TTI regardless of the number of allocated resource blocks. In other words, it is not necessary to change the transmission cycle of uplink control channels (ACK/NACK) even when the transmission rate of downlink data channels is increased by increasing the number of resource blocks allocated.

Meanwhile, downlink control channels for user devices with poor channel conditions are preferably scheduled such that the number of multiplexed users in the frequency direction (the number of multiplexed users in one TTI) becomes small.

First Embodiment

Base Station—Downlink

Figure 3:
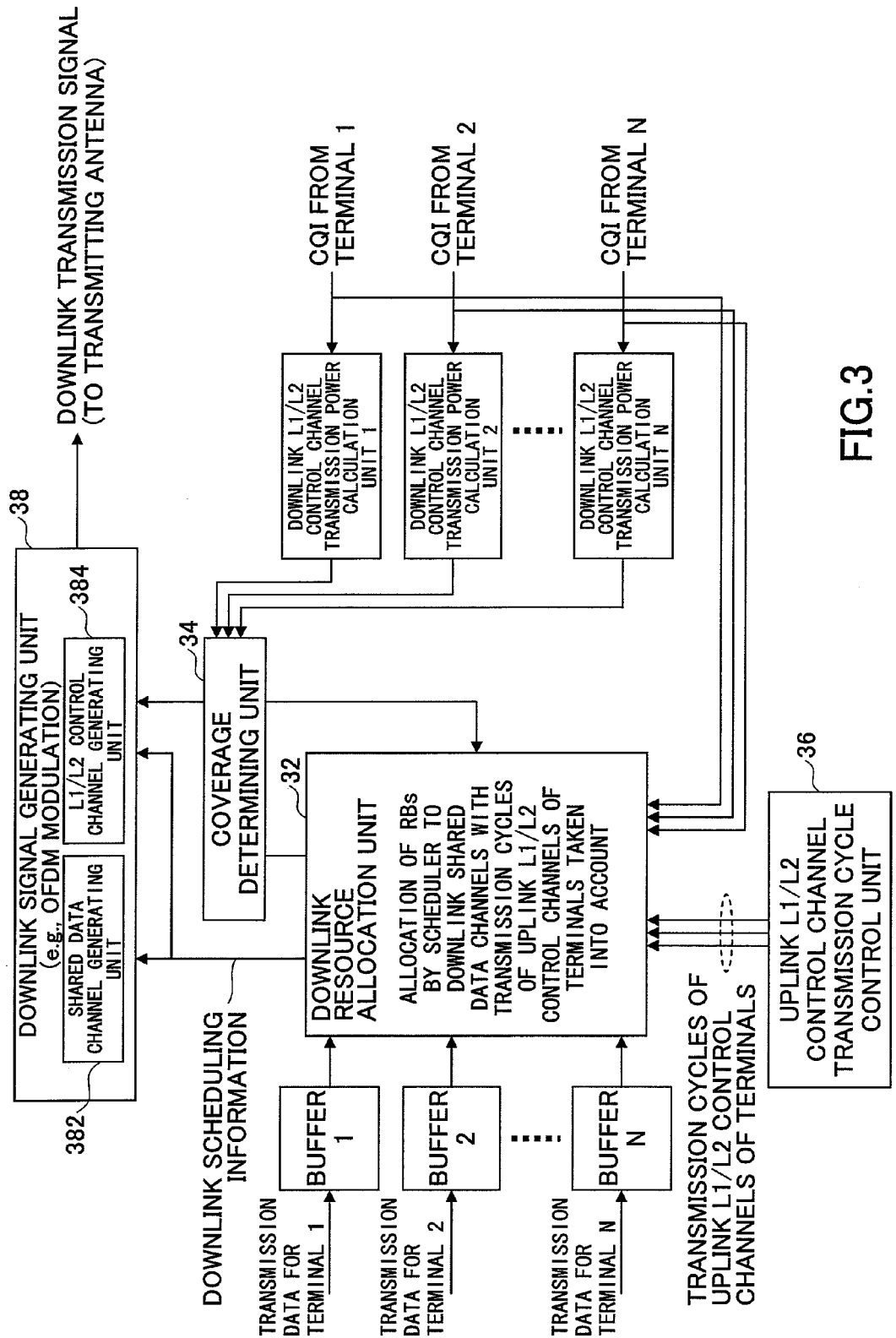
FIG. 3 is a block diagram illustrating a functional configuration related to downlink scheduling of a base station according to an embodiment of the present invention.

FIG. 3 is a partial block diagram illustrating a functional configuration of a base station according to an embodiment of the present invention. FIG. 3 mainly shows functional components or entities related to downlink scheduling. As shown in FIG. 3, the base station includes buffers 1 through N, a downlink resource allocation unit 32, downlink L1/L2 control channel transmission power calculation units 1 through N, a coverage determining unit 34, an uplink L1/L2 control channel transmission cycle control unit 36, and a downlink signal generating unit 38 including a shared data channel generating unit 382 and an L1/L2 control channel generating unit 384.

Each of the buffers 1 through N temporarily stores transmission data (downlink transmission data) to be transmitted to the corresponding one of terminals 1 through N and sends the downlink resource allocation unit 32 information regarding the amount of buffered data to be transmitted. Here, "terminals" indicate "user devices" and include not only mobile terminals but also fixed terminals.

The downlink resource allocation unit 32 determines, based on various criteria, resource blocks (RBs) to be allocated to user devices, modulation schemes and channel coding rates to be applied, and the levels of transmission power. The determined results are sent as downlink scheduling information to the downlink signal generating unit 38 and are included in control channels. Resource blocks are defined by a predetermined bandwidth FRB and a predetermined time period $T_{RB}$. User devices are selected based primarily on CQIs reported by the user devices. In selecting user devices, any known scheduling algorithm such as the maximum CIR method or the proportional fairness method may be used. Also, other factors such as the amounts of data in transmit buffers may be taken into account to achieve fairness among user devices.

The downlink L1/L2 control channel transmission power calculation units 1 through N calculate transmission power for downlink L1/L2 control channels to be transmitted next based on downlink channel quality indicators (CQIs) reported by the corresponding terminals 1 through N. The downlink L1/L2 control channel transmission power calculation units 1 through N may also be configured to change data modulation schemes and coding rates of control channels.

The coverage determining unit 34 determines the manner in which the downlink L1/L2 control channels are to be transmitted and sends the determined results to the downlink resource allocation unit 32. Details of the coverage determining unit 34 and its operations are described later.

The uplink L1/L2 control channel transmission cycle control unit 36 determines or confirms transmission cycles $T_{UP}$ of uplink L1/L2 control channels and sends the transmission cycles $T_{UP}$ to the downlink resource allocation unit 32. Scheduling information is generated such that downlink data channels are transmitted at transmission cycles $T_{DOWN}$ that are longer than or equal to the corresponding transmission cycles $T_{UP}$.

The downlink signal generating unit 38 generates a downlink signal according to the scheduling information. For example, when an orthogonal frequency division multiplexing (OFDM) scheme is used for downlink, the downlink signal generating unit 38 generates transmission symbols to be transmitted based on the OFDM scheme.

The shared data channel generating unit 382 generates data channels (shared data channels) to be included in the transmission symbols according to the scheduling information.

The L1/L2 control channel generating unit 384 generates control channels (L1/L2 control channels) to be included in the transmission symbols. Typically, an L1/L2 control channel includes information necessary to restore a downlink data channel (e.g., information indicating the data modulation scheme and the channel coding rate of the downlink data channel). The L1/L2 control channel may also include information (e.g., delivery confirmation information (ACK/NACK) for an uplink data channel) to be transmitted regardless of the presence or absence of a downlink data channel.

Next, an exemplary downlink scheduling process is described. As described above, the downlink resource allocation unit 32 allocates one or more resource blocks to each one of selected user devices based on CQIs reported by the user devices. In this process, the downlink resource allocation unit 32 determines allocation of resources (resource allocation) according to information from the coverage determining unit 34.

The coverage determining unit 34 determines whether it is possible to achieve desired quality of downlink L1/L2 control channels to be transmitted next to the terminals with the power levels calculated by the transmission power calculation units 1 through N and without changing the number of allocated resource blocks. If it is possible to achieve the desired quality, the determined resource allocation is used for downlink transmission without change. If it is difficult to achieve the desired quality, the coverage determining unit 34 determines whether there are spare radio resources (transmission power and symbols) and resource blocks available for the downlink L1/L2 control channels. The determination result is reported to the downlink resource allocation unit 32. If there are spare transmission power and radio resources, the downlink resource allocation unit 32 changes the resource allocation to increase the number of symbols for each of the downlink L1/L2 control channels. In other words, scheduling is performed such that two or more resource blocks including the same downlink L1/L2 control channel are transmitted in the same transmission time interval (TTI). If there is no spare transmission power or resource block, the downlink L1/L2 control channels are transmitted with the power levels calculated by the transmission power calculation units 1 through N and without changing the number of resource blocks.

Figure 4:
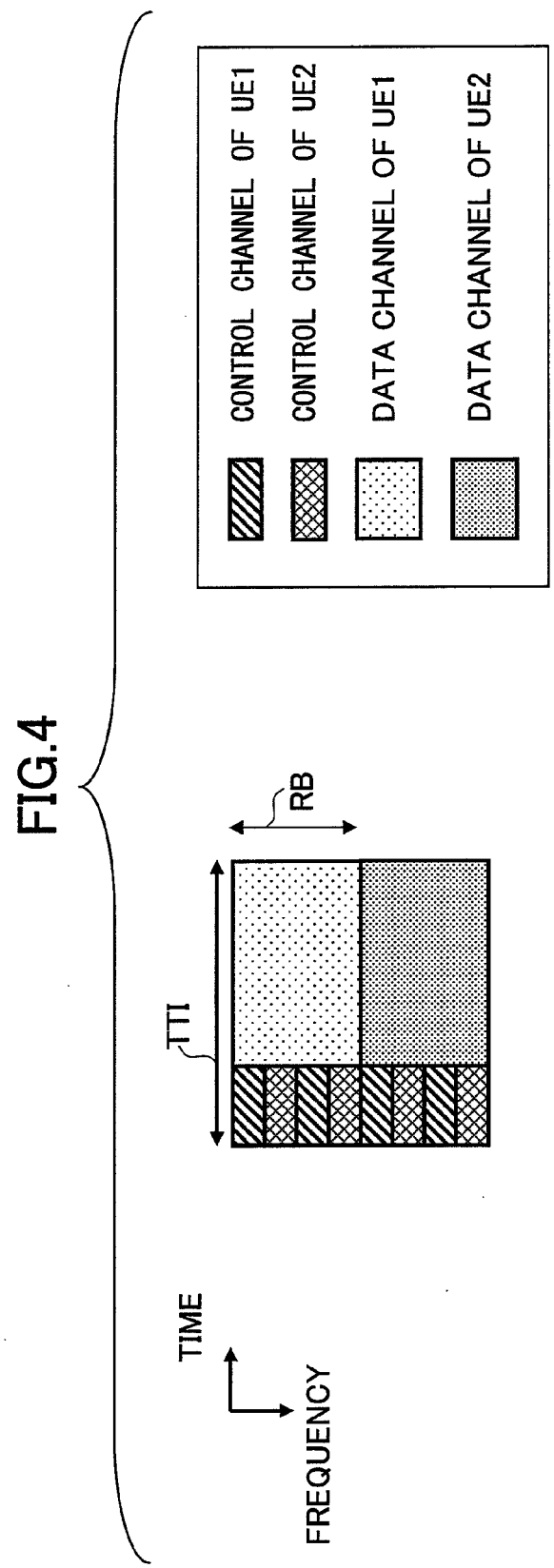
FIG. 4 is a drawing illustrating an example of downlink radio resource allocation.

FIG. 4 shows an example of resource allocation where downlink L1/L2 control channels are transmitted with the power levels calculated by the transmission power calculation units 1 through N and without changing the number of resource blocks. In FIG. 4, for brevity, channels for two user devices only are shown. In an actual case, a scheduler allocates resources to a large number of user devices. Here, it is assumed that user devices near the base station and user devices with good channel conditions can receive downlink control channels with desired quality with minimum resources as shown in FIG. 4.

Figure 5:
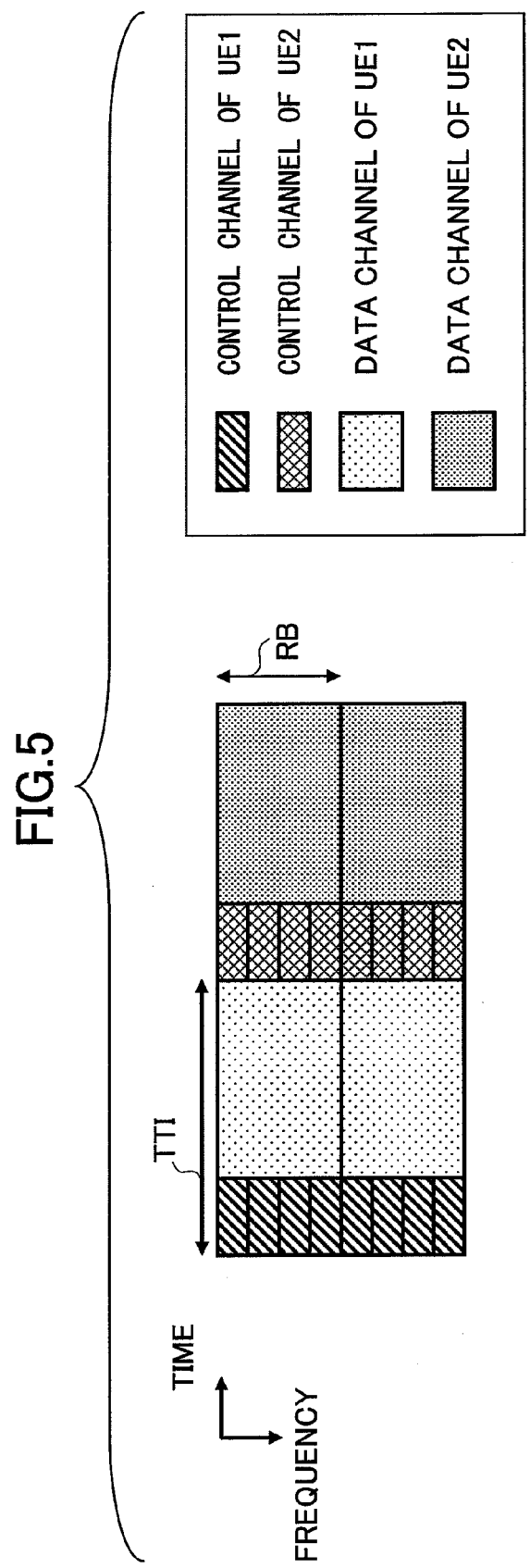
FIG. 5 is a drawing illustrating another example of downlink radio resource allocation.

FIG. 5 shows an example of resource allocation employed when the base station has spare transmission power and resource blocks and when it is difficult to achieve desired quality with the resource allocation as shown in FIG. 4. In FIG. 5, one additional resource block is allocated to a user device UE1 and two resource blocks are allocated in total to the user device UE1. The control channels in the two resource blocks contain the same information. With this resource allocation, the user device UE1 can receive a control channel with higher quality than with the resource allocation shown in FIG. 4. Similarly, with the resource allocation shown in FIG. 5, a user device UE2 can also receive a control channel with high quality.

Figure 6:
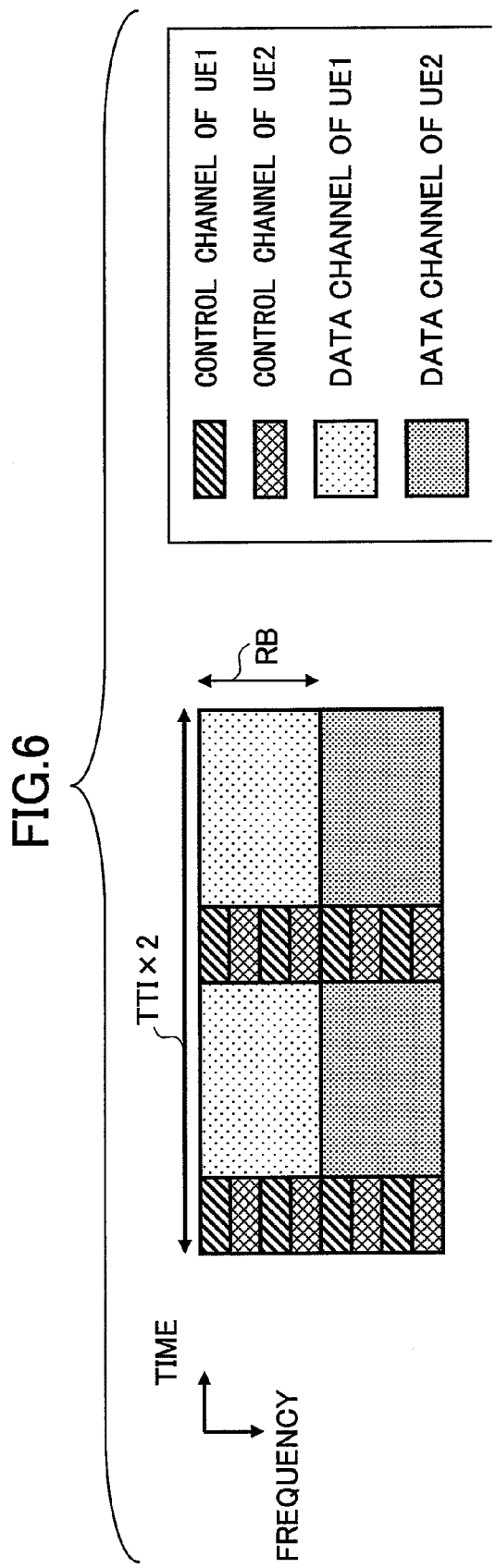
FIG. 6 is a drawing illustrating still another example of downlink radio resource allocation.

As another example, resource allocation as shown in FIG. 6 may also be used to achieve desired reception quality of downlink L1/L2 control channels at user devices. In FIG. 6, two resource blocks for the user device UE1 are arranged in the time direction. However, with this resource allocation, the user device UE1 cannot start signal processing until a period of time corresponding to TTI×2 passes and as a result, the control delay (or the round-trip delay) increases. Meanwhile, with the resource allocation as shown in FIG. 5, since two resource blocks of the user device UE1 are transmitted in the same subframe, the control delay does not increase. Accordingly, downlink control channels for user devices with poor channel conditions are preferably scheduled such that the number of multiplexed users in the frequency direction (the number of multiplexed users in a subframe) becomes small.

(Base Station—Uplink)

Figure 7:
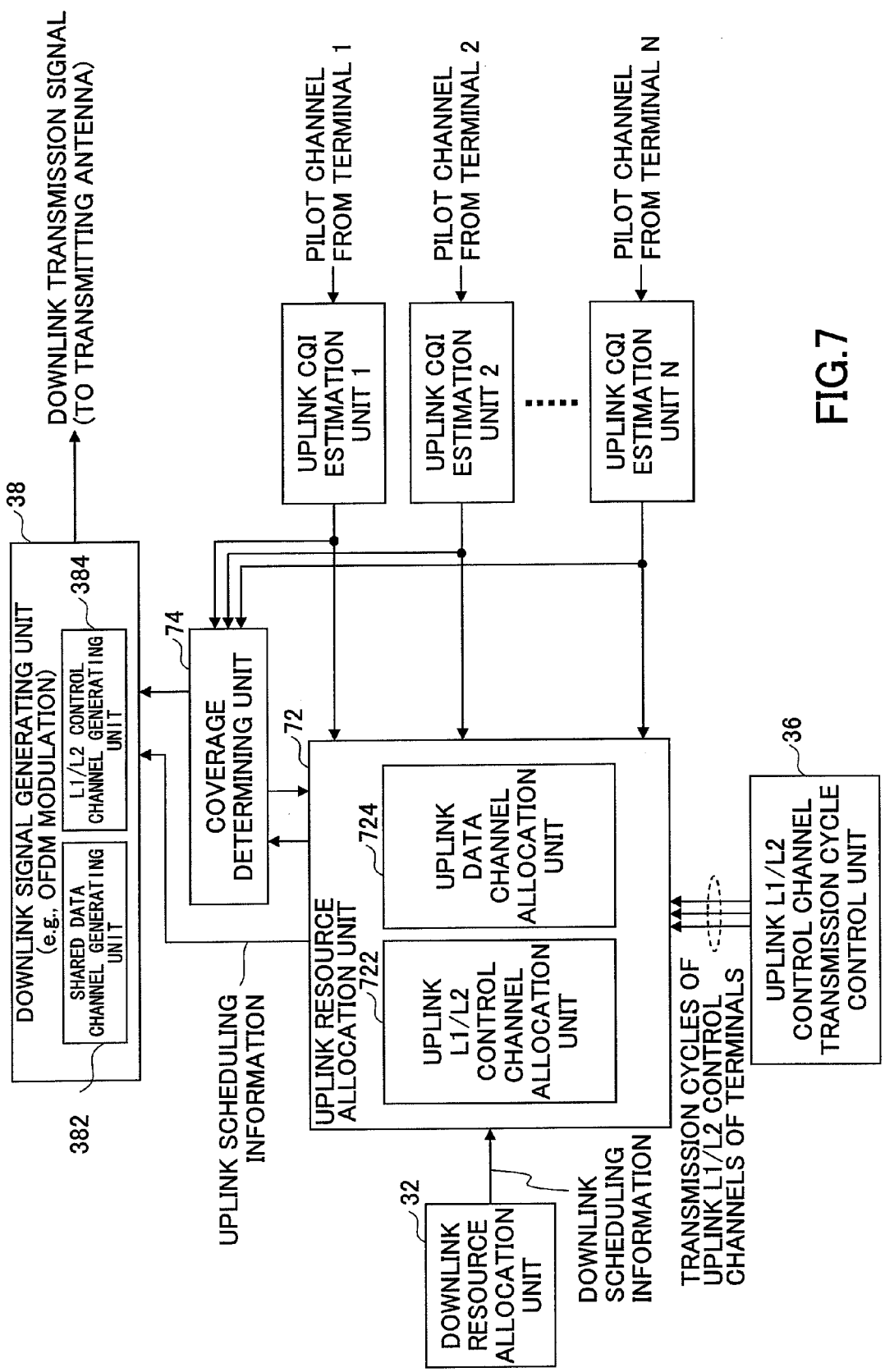
FIG. 7 is a block diagram illustrating a functional configuration related to uplink scheduling of a base station according to an embodiment of the present invention.

FIG. 7 is a partial block diagram illustrating a functional configuration of a base station according to an embodiment of the present invention. FIG. 7 mainly shows entities related to uplink scheduling. As shown in FIG. 7, the base station includes the downlink resource allocation unit 32, an uplink resource allocation unit 72 including an uplink L1/L2 control channel allocation unit 722 and an uplink data channel allocation unit 724, uplink CQI estimation units 1 through N, a coverage determining unit 74, the uplink L1/L2 control channel transmission cycle control unit 36, and the downlink signal generating unit 38 including the shared data channel generating unit 382 and the L1/L2 control channel generating unit 384.

The downlink resource allocation unit 32, the uplink L1/L2 control channel transmission cycle control unit 36, the downlink signal generating unit 38, the shared data channel generating unit 382, and the L1/L2 control channel generating unit 384 are already described above and therefore their overlapping descriptions are omitted here. In this embodiment, functional components of the base station related to downlink scheduling and uplink scheduling are shown separately in FIGS. 3 and 7. However, it is not essential to provide those functional components as separate units. One or more of the functional components shown in FIGS. 3 and 7 may be implemented by hardware, software, or a combination of hardware and software as one processing block.

The downlink resource allocation unit 32 has a function as described above and also sends downlink scheduling information to the uplink resource allocation unit 72. The downlink scheduling information includes downlink data channel allocation information (particularly, information indicating the downlink data channel transmission cycle $T_{DOWN}$).

The uplink resource allocation unit 72 determines, based on various criteria, resource blocks (RBs) to be allocated to user devices, modulation schemes and channel coding rates to be applied, and the levels of transmission power. The determined results are sent as scheduling information to the downlink signal generating unit 38 and are included in control channels. User devices are selected based primarily on uplink CQIs of the user devices. In selecting user devices, any known scheduling algorithm such as the maximum CIR method or the proportional fairness method may be used. Also, other factors such as the amounts of data in transmit buffers may be taken into account to achieve fairness among user devices.

The uplink L1/L2 control channel allocation unit 722 determines allocation of resources for uplink L1/L2 control channels. The uplink data channel allocation unit 724 determines allocation of resources for uplink data channels.

An uplink L1/L2 control channel may include first control information (essential control information) that is always sent together with an uplink data channel and/or second control information that is sent regardless of the presence or absence of an uplink data channel. The first control information includes information, such as the modulation scheme and the channel coding rate of an uplink data channel, that is necessary to demodulate the uplink data channel. The second control information includes a downlink CQI and delivery confirmation information (ACK/NACK) for a downlink data channel. A user device may include the first control information, the second control information, or both of them in an uplink control channel.

When a resource block(s) (radio resources) is allocated for transmission of an uplink data channel, the first control information (and the second control information, if necessary) is sent from the user device using the same resource block. When no resource block is allocated for transmission of an uplink data channel (or when transmission of uplink data channels is not requested), the second control information is sent from the user device using a dedicated resource block (a dedicated frequency band).

The uplink CQI estimation units 1 through N measure the quality of pilot channels received from the corresponding terminals (user devices) 1 through N and calculates uplink channel quality indicators (CQIs). The uplink CQIs are sent to the uplink resource allocation unit 72.

The coverage determining unit 74 determines the manner in which the uplink L1/L2 control channels are to be transmitted and sends the determined result to the uplink resource allocation unit 72. The coverage determining unit 74 determines whether it is possible to achieve desired quality of uplink L1/L2 control channels to be transmitted next from the terminals based on the uplink CQIs from the uplink CQI estimation units 1 through N. If it is possible to achieve the desired quality, uplink scheduling information is generated based on the previous resource allocation.

If it is difficult to achieve the desired quality of the uplink control channels, the coverage determining unit 74 determines whether there are spare resource blocks and sends the determination result to the uplink resource allocation unit 72. If there are spare resource blocks, the uplink resource allocation unit 72 changes the resource allocation to increase the number of resource blocks used for the respective uplink L1/L2 control channels. In this case, scheduling is performed such that two or more resource blocks including the same uplink L1/L2 control channel are transmitted in different transmission time intervals (TTIs). This is different from the downlink scheduling where two or more resource blocks including the same downlink L1/L2 control channel are transmitted in the same transmission time interval. If there is no spare resource block, uplink scheduling information is generated based on the previous resource allocation.

Figure 8:
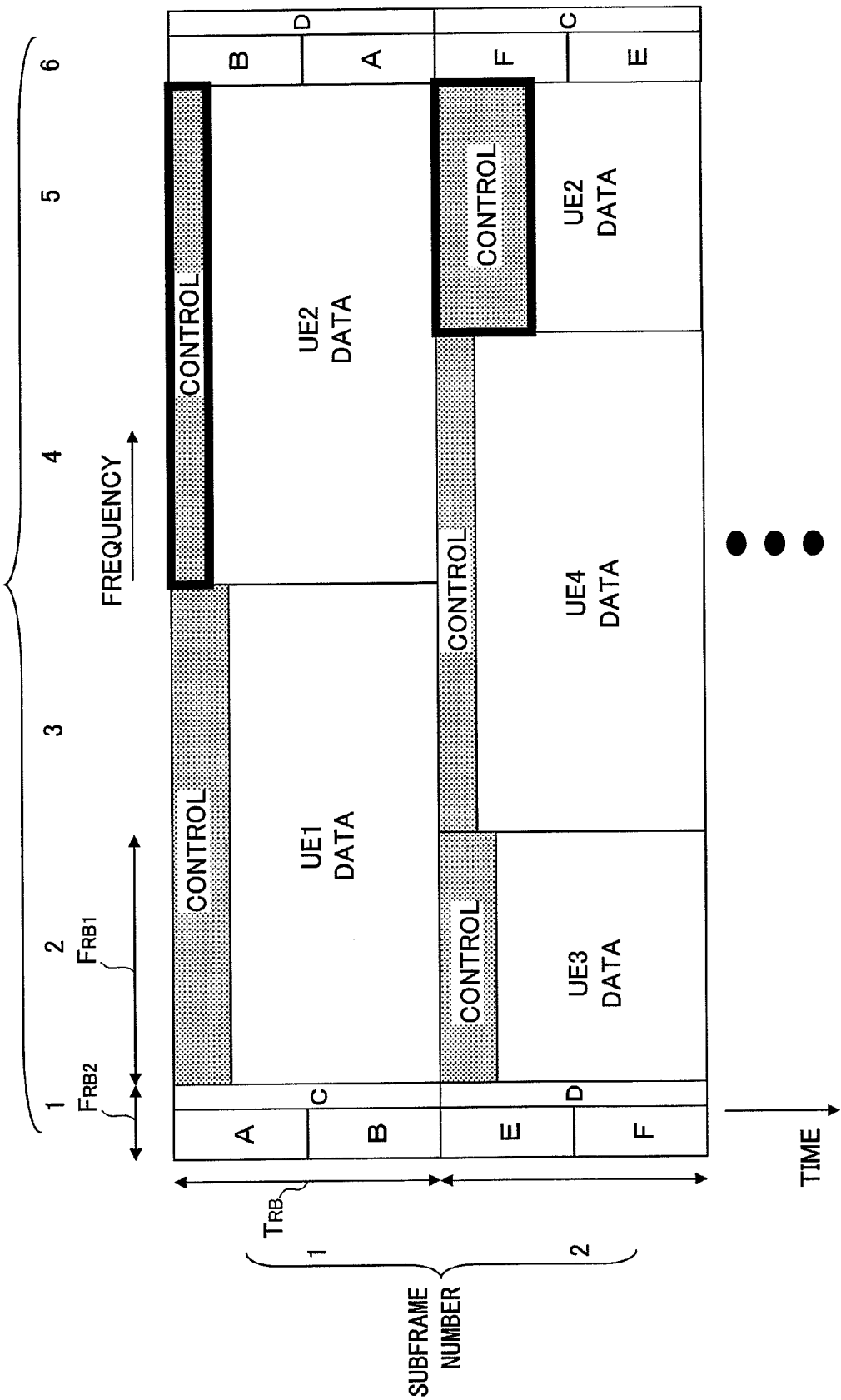
FIG. 8 is a drawing illustrating an example of uplink radio resource allocation.

FIG. 8 is a drawing illustrating an example of uplink radio resource allocation. In FIG. 8, two sizes of resource blocks (large resource blocks and small resource blocks) are provided. The large resource blocks, for example, have a bandwidth $F_{RB1}$ of 1.25 MHz and a time period $T_{RB}$ of 0.5 ms. The small resource blocks, for example, have a bandwidth $F_{RB2}$ of 375 kHz and a time period $T_{RB}$ of 0.5 ms. As described above, the time period may also be called a unit transmission period, a transmission time interval (TTI), or a subframe. One time period may correspond to the duration of one wireless packet. In this example, six resource blocks are arranged in the frequency direction and the small resource blocks are located at the right and left ends. Various arrangement patterns may be used to arrange resource blocks as long as they are known to the sending and receiving ends.

In the exemplary uplink scheduling shown in FIG. 8, control channels (first control channels) accompanying uplink data channels and second control channels (if necessary) are transmitted in parts of the time periods of the large resource blocks (the second, third, fourth, and fifth resource blocks). In other words, control channels and data channels are time-division-multiplexed. The proportion of a control channel in one or more resource blocks allocated for transmission of an uplink data channel may be determined flexibly according to channel conditions of the user device. In this example, two resource blocks are allocated for data channel transmission of each of the user devices UE1, UE2, and UE4 and the user device UE1 uses more resources (a longer time period) for the transmission of the uplink control channel than the user devices UE2 and UE4. In general, a smaller proportion of resource blocks is allocated to a control channel when channel conditions are good and a larger proportion of resource blocks is allocated to a control channel when channel conditions are poor. In this exemplary uplink scheduling, the small resource blocks (the first and sixth resource blocks) are allocated to control channels (second control channels) that are transmitted regardless of the presence or absence of uplink data channels. In other words, the frequency bands corresponding to the first and sixth resource blocks are dedicated to transmission of second control channels.

In FIG. 8, the time period (subframe) $T_{RB}$ of each of the small resource blocks (first and sixth resource blocks) is further divided into two sub-periods. For example, a second control channel of a user device is transmitted using the first resource block in a first sub-period (the first half) of a first subframe and using the sixth resource block in a second sub-period (the second half) of the first subframe as indicated by "A" in FIG. 8. Similarly, a second control channel of another user device is transmitted using the sixth resource block in the first sub-period of the first subframe and using the first resource block in the second sub-period of the first subframe as indicated by "B" in FIG. 8. Thus, a second control channel is transmitted using multiple frequencies and time slots (i.e., the second control channel hops in the frequency and time directions). This method makes it possible to achieve frequency diversity gain and thereby to achieve the desired quality of second control channels. The transmission of the uplink control channels of the user devices using resources "A" and "B" is completed within one subframe. This resource allocation method may be used for user devices with no uplink data channel to be transmitted if the coverage determining unit 74 shown in FIG. 7 determines that next uplink L1/L2 control channels of the user devices can be transmitted with desired quality. In the case of a user device (in this example, any one of the user devices UE1 through UE4) having an uplink data channel to which resource blocks (one or more of the second through fifth resource blocks) are allocated, the first and second control channels are transmitted using the allocated resource blocks.

Meanwhile, if the coverage determining unit 74 determines that it is difficult to achieve desired quality of an uplink control channel of a user device and if there are spare uplink resource blocks, the number of resource blocks for the uplink control channel of the user device is increased. For example, if it is difficult to achieve the desired quality with resource allocation indicated by "A", the second control channel of the user device is transmitted using the first resource block in the first subframe and the sixth resource block in the second subframe as indicated by "C" in FIG. 8. Similarly, a second control channel of another user device is transmitted using the sixth resource block in the first subframe and the first resource block in the second subframe. Thus, a second control channel is transmitted using multiple frequencies and time slots (i.e., the second control channel hops in the frequency and time directions). Like the above resource allocation method, this method also makes it possible to achieve frequency diversity gain. Also with this method, an uplink control channel is transmitted using a long time period. This in turn makes it possible to improve the reception quality of the uplink control channel at the base station. For a user device having an uplink data channel to which one or more of the second through fifth resource blocks are allocated, scheduling is performed such that the same control channel is transmitted using the same frequency band as that of the uplink data channel in multiple consecutive subframes (data channels transmitted in the subframes may be different). In the case of the user device UE2 in FIG. 8, control channels are transmitted together with data channels using the fourth and fifth resource blocks in the first subframe and using the fifth resource block in the second subframe. The control channels surrounded by bold lines are the same.

In the above example, the transmission period of an uplink control channel (second control channel) is increased from one subframe to two subframes. The transmission period of a second control channel may be increased to any integral multiple of a subframe.

In the above descriptions, an uplink control channel is transmitted using two subframes (TTI×n) as a transmission unit and an uplink data channel is transmitted using one subframe as a transmission unit. However, this does not mean that an uplink data channel cannot be transmitted using two subframes as a transmission unit. For example, the data transmitted by the user device UE2 in the first subframe may be the same as the data transmitted by the user device UE2 in the second subframe. Doubling the transmission period of an uplink data channel makes it possible to improve the reception quality of the uplink data channel at the base station. However, for this purpose, it is necessary to configure a base station to be able to properly receive and process signals that use two types of TTIs having different lengths (long and short). This in turn complicates the configuration and signal processing of the base station. Still, as long as the TTI of signals to be received by user devices is constant, the above methods do not complicate the configuration of user devices, signal processing at the user devices, or testing processes of the user devices. Also, to reduce overhead such as CRC code that accompanies uplink data channels, it is preferable to use a long TTI.

(User Device)

Figure 9:
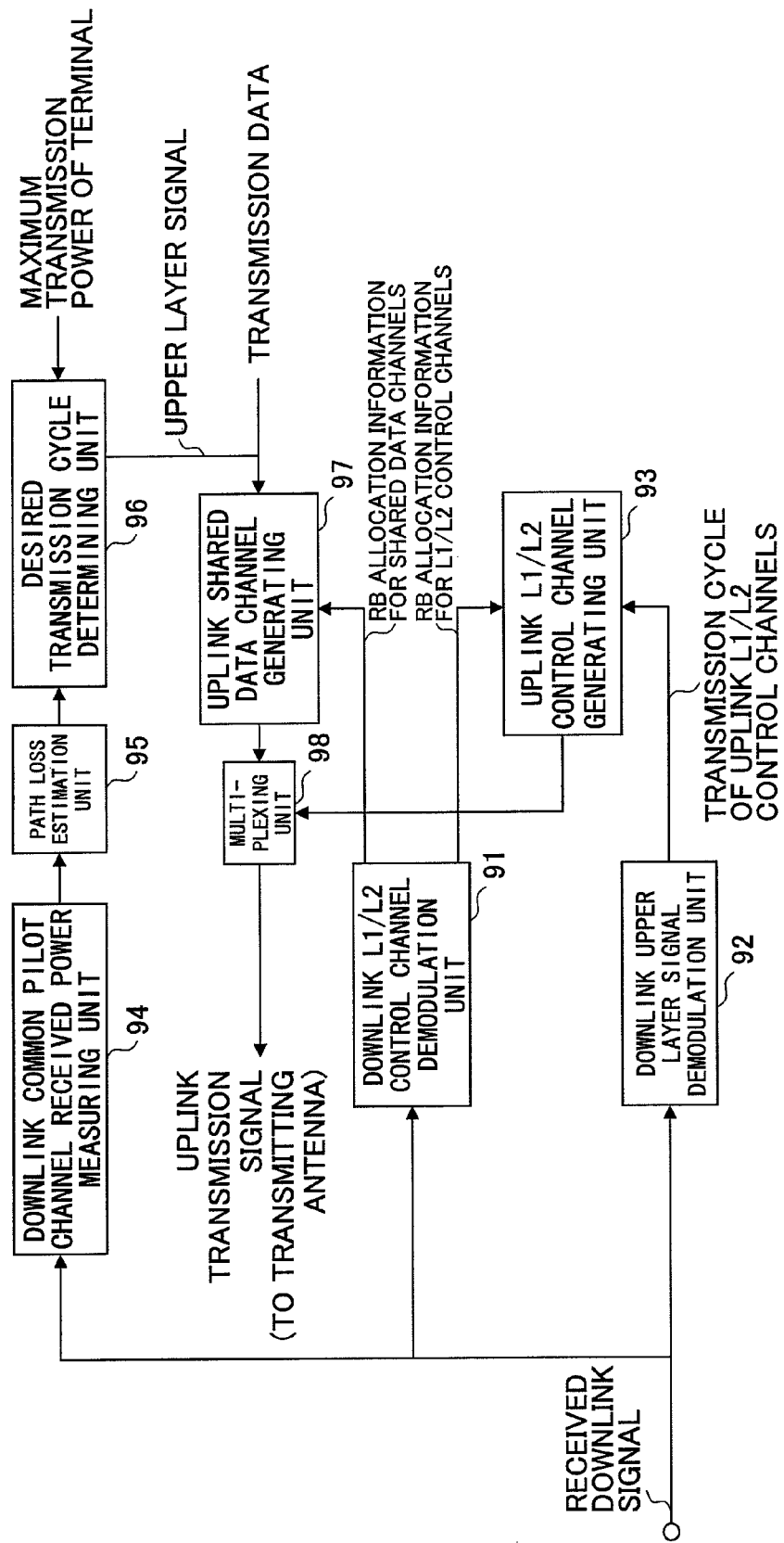
FIG. 9 is a partial block diagram illustrating a user device according to an embodiment of the present invention.

FIG. 9 is a partial block diagram illustrating a user device according to an embodiment of the present invention. As shown in FIG. 9, the user device includes a downlink L1/L2 control channel demodulation unit 91, a downlink upper layer signal demodulation unit 92, an uplink L1/L2 control channel generating unit 93, a downlink common pilot channel received power measuring unit 94, a path loss estimation unit 95, a desired transmission cycle determining unit 96, an uplink shared data channel generating unit 97, and a multiplexing unit 98.

The downlink L1/L2 control channel demodulation unit 91 extracts an L1/L2 control channel from a received downlink signal and demodulates and decodes the extracted L1/L2 control channel. The L1/L2 control channel may be a control channel accompanying a downlink data channel, scheduling information for uplink data channels and/or uplink control channels, or a control channel transmitted regardless of the presence or absence of a downlink data channel.

The downlink upper layer signal demodulation unit 92 demodulates and decodes a downlink upper layer signal (a signal of a layer higher than L1 and L2). The downlink upper layer signal may include information indicating the transmission cycle of uplink L1/L2 control channels.

The uplink L1/L2 control channel generating unit 93 generates uplink L1/L2 control channels based on scheduling information (e.g., resource block allocation information) from the downlink L1/L2 control channel demodulation unit 91 and the transmission cycle determined by the base station.

The downlink common pilot channel received power measuring unit 94 measures the reception quality of a common pilot channel sent from the base station. The reception quality may be represented by any appropriate indicator such as SIR or SINR.

The path loss estimation unit 95 receives downlink common pilot channels and signals indicating the transmission power levels of the downlink common pilot channels for a predetermined period of time and calculates an average path loss L. The path loss L changes mainly due to distance variation and shadowing. The influence of instantaneous variation such as fading in a path loss can be reduced by averaging reception quality values in a comparatively long period of time that spans, for example, one or more frames.

The desired transmission cycle determining unit 96 calculates a desired value of the transmission cycle (desired transmission cycle) of uplink L1/L2 control channels. The desired transmission cycle is set at a value that is favorable to achieve the desired quality of the uplink L1/L2 control channels under the channel conditions indicated by a current path loss and under the limitation of the maximum transmission power of the user device (i.e., an integral multiple of a subframe).

The uplink shared data channel generating unit 97 generates uplink data channels. A data channel may include user data to be transmitted from the user device and the desired transmission cycle described above.

The multiplexing unit 98 multiplexes uplink control channels and uplink data channels and thereby generates an uplink transmission signal.

(Updating Transmission Cycle of Uplink Control Channels)

As described above, the transmission cycle $T_{UP}$ of uplink control channels is determined or confirmed by the transmission cycle control unit 36 shown in FIG. 3 (and FIG. 7). The transmission cycle $T_{UP}$ may be 1) determined by the base station taking into account a desired transmission cycle sent from the user device or 2) determined unilaterally by the base station.

Figure 10:
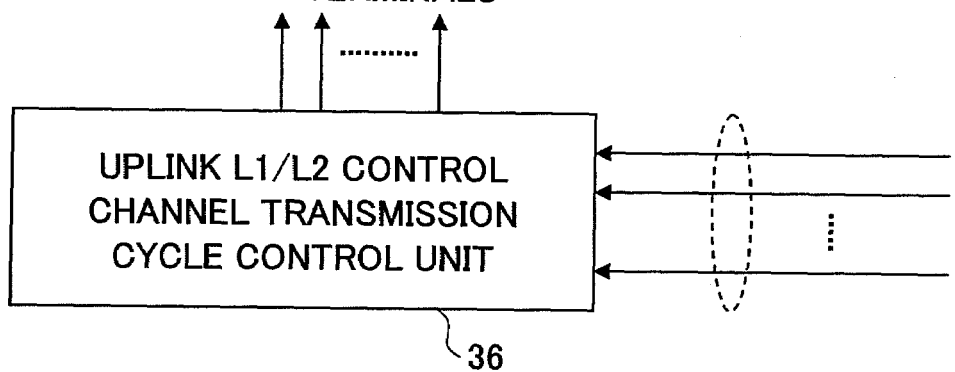
FIG. 10 is a drawing illustrating an example of a transmission cycle control unit.

FIG. 10 shows the transmission cycle control unit 36 of FIG. 3 used in the former case 1). In this case, the transmission cycle control unit 36 sets the transmission cycle basically at a value (desired value) requested by the corresponding terminal (user device). However, the transmission cycle control unit 36 may set the transmission cycle at a value different from the desired value according to communication conditions. For example, when the cell is congested, the transmission cycle control unit 36 may set the transmission cycle at a value (TTI×n) greater than the desired value sent from the user device and allocate low transmission power to the user device to reduce the interference observed at the base station. The frequency of reporting desired values to the base station to update the transmission cycle may be comparatively low and therefore the desired values may be sent as upper layer signals. For example, the transmission cycle may be updated at a low frequency of once per 100 ms.

Figure 11:
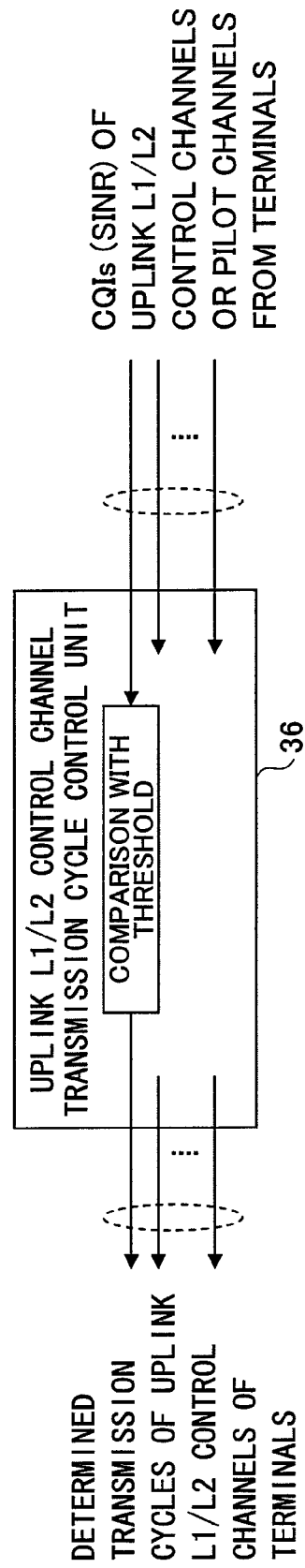
FIG. 11 is a drawing illustrating another example of a transmission cycle control unit.

FIG. 11 shows the transmission cycle control unit 36 of FIG. 3 used in the latter case 2). In this case, the transmission cycle control unit 36 changes the transmission cycle depending on whether the quality (e.g., SIR, SINR, or CQI) of a signal received from the corresponding terminal (user device) is greater than a predetermined level. The signal used for this purpose may be an uplink pilot channel or an uplink control channel. When the transmission cycle is determined unilaterally by the base station without taking into account the desired value from the user device, the desired transmission cycle determining unit 96 shown in FIG. 9 may be omitted.

After updating the transmission cycle, the base station reports the result (the updated value of the transmission cycle of uplink L1/L2 control channels) to the user device, for example, via an upper layer signal.

(Relationship Between $T_{UP}$ and $T_{DOWN}$)

As described above, in this embodiment, downlink data channels and downlink control channels are transmitted using one transmission time interval (TTI) as a transmission unit. Meanwhile, uplink control channels are transmitted using an integral multiple of a transmission time interval ($T_{UP}$=TTI× n) as a transmission unit. However, the transmission cycle $T_{DOWN}$ of downlink data channels is set at a value longer than or equal to the transmission unit $T_{UP}$ of uplink control channels ($T_{DOWN} \geq T_{UP}$). This is because the user device returns delivery confirmation signals (ACK/NACK) via uplink control channels in response to downlink data channels.

Figure 12:
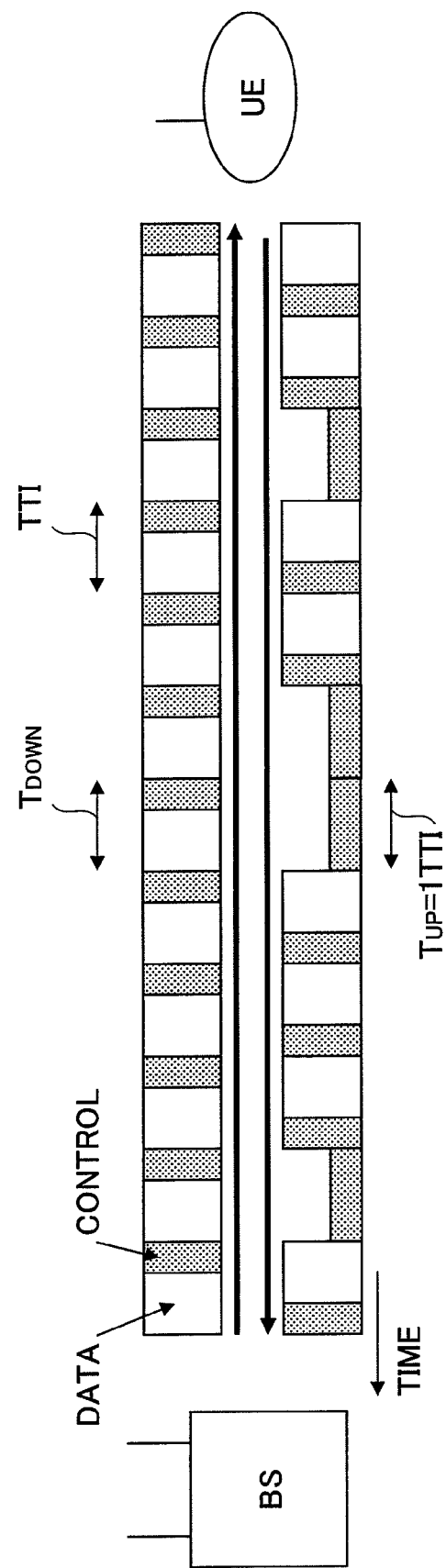
FIG. 12 is a drawing illustrating the relationships between an uplink control channel transmission unit $T_{UP}$, a downlink data channel transmission unit TTI, and a downlink data channel transmission cycle $T_{DOWN}$.

FIG. 12 shows an example where $T_{UP}$=$T_{DOWN}$=1 TTI (one subframe). In this example, downlink data channels are transmitted (together with downlink control channels) every one TTI and delivery confirmation signals (ACK/NACK) for the downlink data channels are transmitted every one TTI via uplink control channels. The uplink control channels are transmitted regardless of the presence or absence of uplink data channels. In four subframes (the second, sixth, seventh, and tenth subframes from the left) shown in FIG. 12, only uplink control channels (second control channels) are transmitted.

Figure 13:
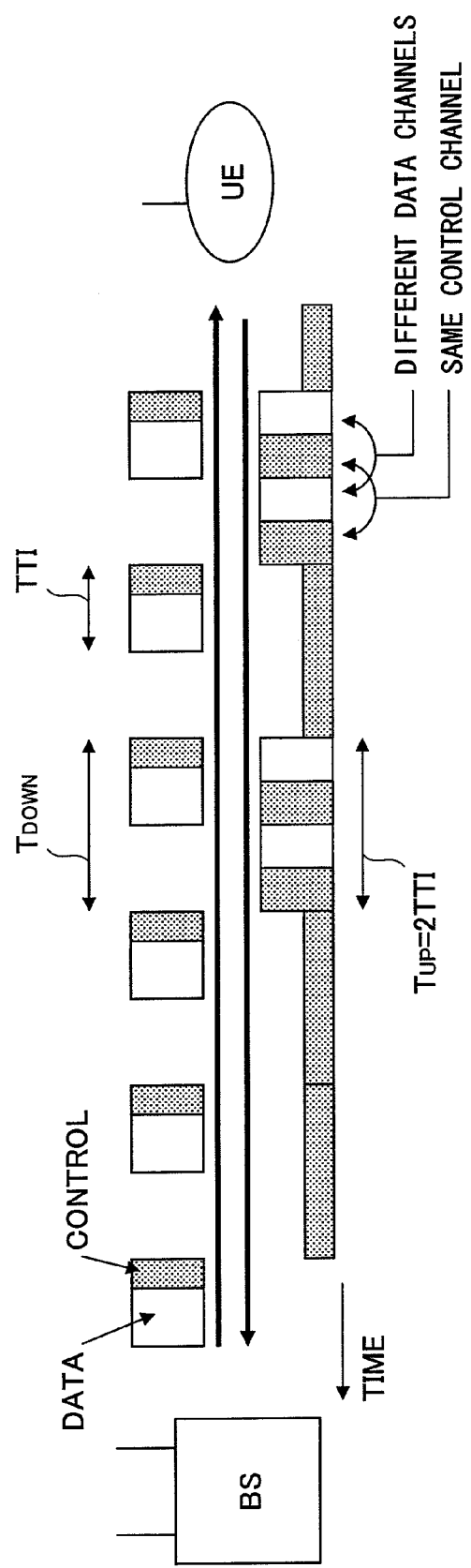
FIG. 13 is a drawing illustrating the relationships between an uplink control channel transmission unit $T_{UP}$, a downlink data channel transmission unit TTI, and a downlink data channel transmission cycle $T_{DOWN}$.

FIG. 13 shows an example where $T_{UP}$=$T_{DOWN}$=2 TTIs. In this example, the transmission unit $T_{UP}$ is increased to two TTIs to achieve the desired quality of uplink control channels. Still, uplink data channels are transmitted using one TTI as a transmission unit. Therefore, within one transmission unit $T_{UP}$=2 TTIs, the same control channel is transmitted twice and two different data channels are transmitted once. In other words, the two control channels in each transmission cycle contain the same information, and the two data channels in each transmission cycle contain different information and are encoded in different manners. Because the transmission cycle of uplink control channels is increased to two TTIs, the transmission cycle of downlink data channels is also increased to two TTIs. In this case, delivery confirmation signals (ACK/NACK) for the downlink data channels are transmitted every two TTIs via uplink control channels.

Figure 14:
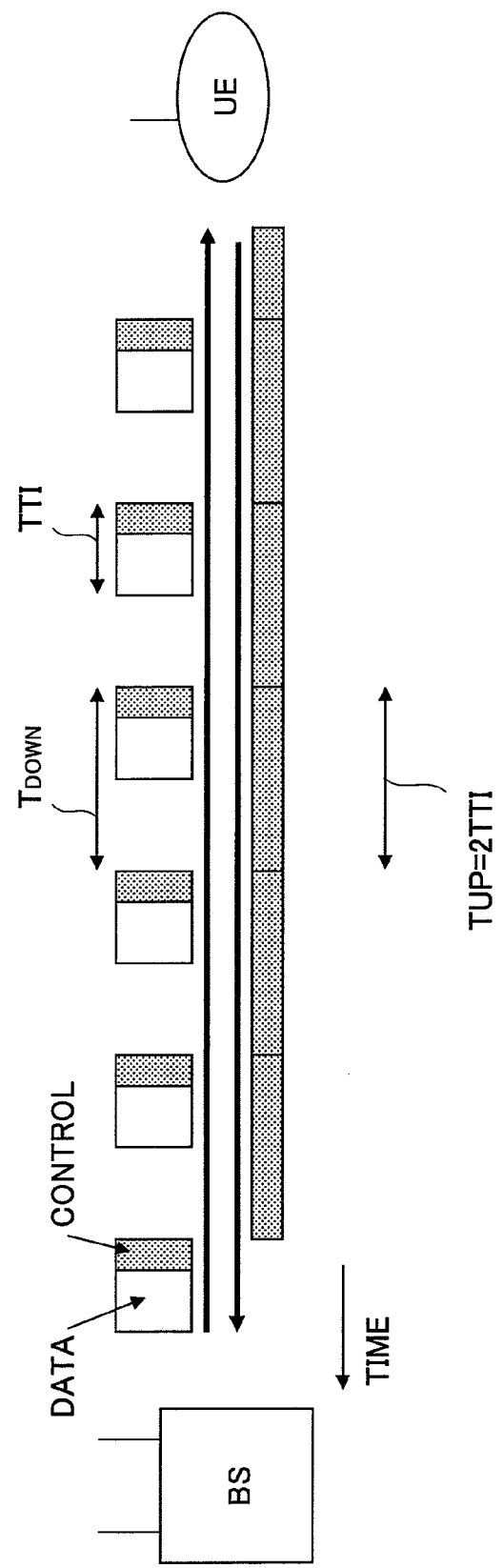
FIG. 14 is a drawing illustrating the relationships between an uplink control channel transmission unit $T_{UP}$, a downlink data channel transmission unit TTI, and a downlink data channel transmission cycle $T_{DOWN}$.

FIG. 14 shows another example where $T_{UP}$=$T_{DOWN}$=2 TTIs. In this example, the transmission unit $T_{UP}$ is also increased to two TTIs to achieve the desired quality of uplink control channels, but uplink data channels are not being transmitted. Assume that resource blocks are allocated for transmission of uplink data channels when it is determined by the coverage determining unit 74 shown in FIG. 7 that it is difficult to achieve the desired quality of uplink control channels. In this case, the uplink data channels and the uplink control channels are transmitted using the second through fifth resource blocks shown in FIG. 8. However, if uplink control channels are transmitted using wide bands (the second through fifth resource blocks) when it is difficult to achieve the desired quality even with narrow bands (the first and sixth resource blocks) dedicated for uplink control channels, the quality of the uplink control channels may be further reduced. Therefore, in such a case, it is preferable not to allocate resource blocks to uplink data channels as shown in FIG. 14.

(HARQ)

Figure 15:
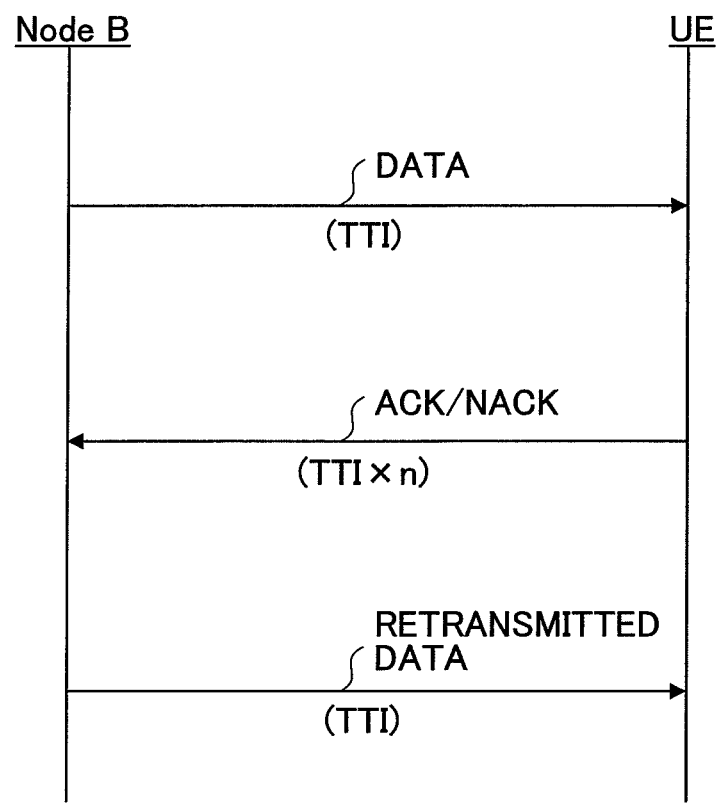
FIG. 15 is a sequence chart showing a downlink retransmission control process.

FIG. 15 is a sequence chart showing a downlink retransmission control process. As described above, downlink data channels are transmitted using one TTI as a transmission unit, and uplink control channels including delivery confirmation signals (ACK/NACK) for the downlink data channels are transmitted using an integral multiple of TTI as a transmission unit. When a delivery confirmation signal indicates NACK, the corresponding downlink data channel is retransmitted. Although the transmission unit indicated by an integral multiple of TTI does not change frequently, it is not a fixed value. Therefore, it is not possible to predict all timings when packets are to be retransmitted. For this reason, an asynchronous hybrid automatic repeat request (HARQ) method is preferably used for downlink retransmission control.

Figure 16:
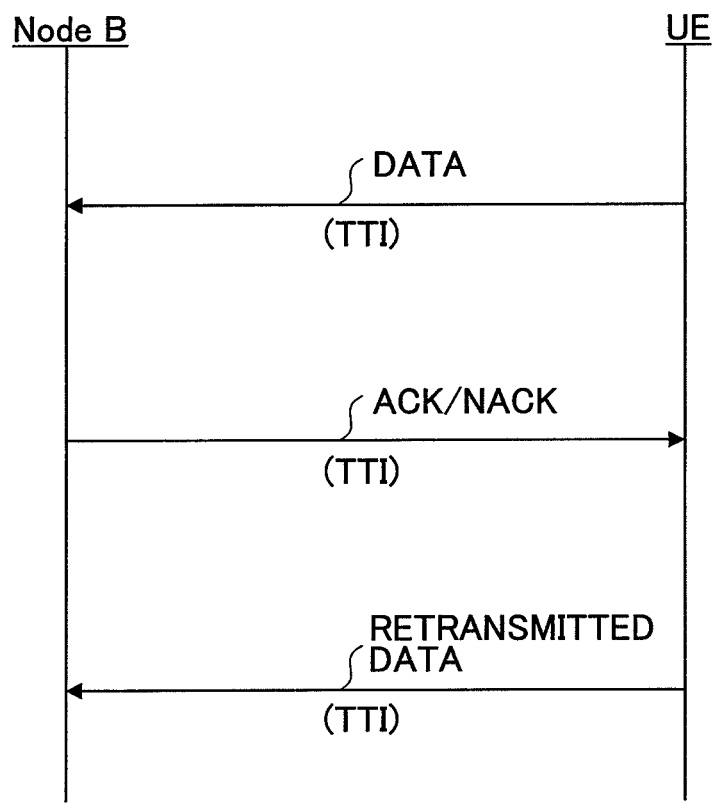
FIG. 16 is a sequence chart showing an uplink retransmission control process.

FIG. 16 is a sequence chart showing an uplink retransmission control process. As described above, uplink data channels are basically transmitted using one TTI as a transmission unit, and downlink control channels including delivery confirmation signals (ACK/NACK) for the uplink data channels are also transmitted using one TTI as a transmission unit. Since the TTI is a fixed value in a system, it is possible to predict all timings when packets are retransmitted. Therefore, a synchronous hybrid automatic repeat request (HARQ) method is preferably used for uplink retransmission control.

Second Embodiment

As described above, using TTIs having different lengths may complicate signal processing. However, this problem may be reduced by appropriately scheduling packets with different TTIs.

Figure 17:
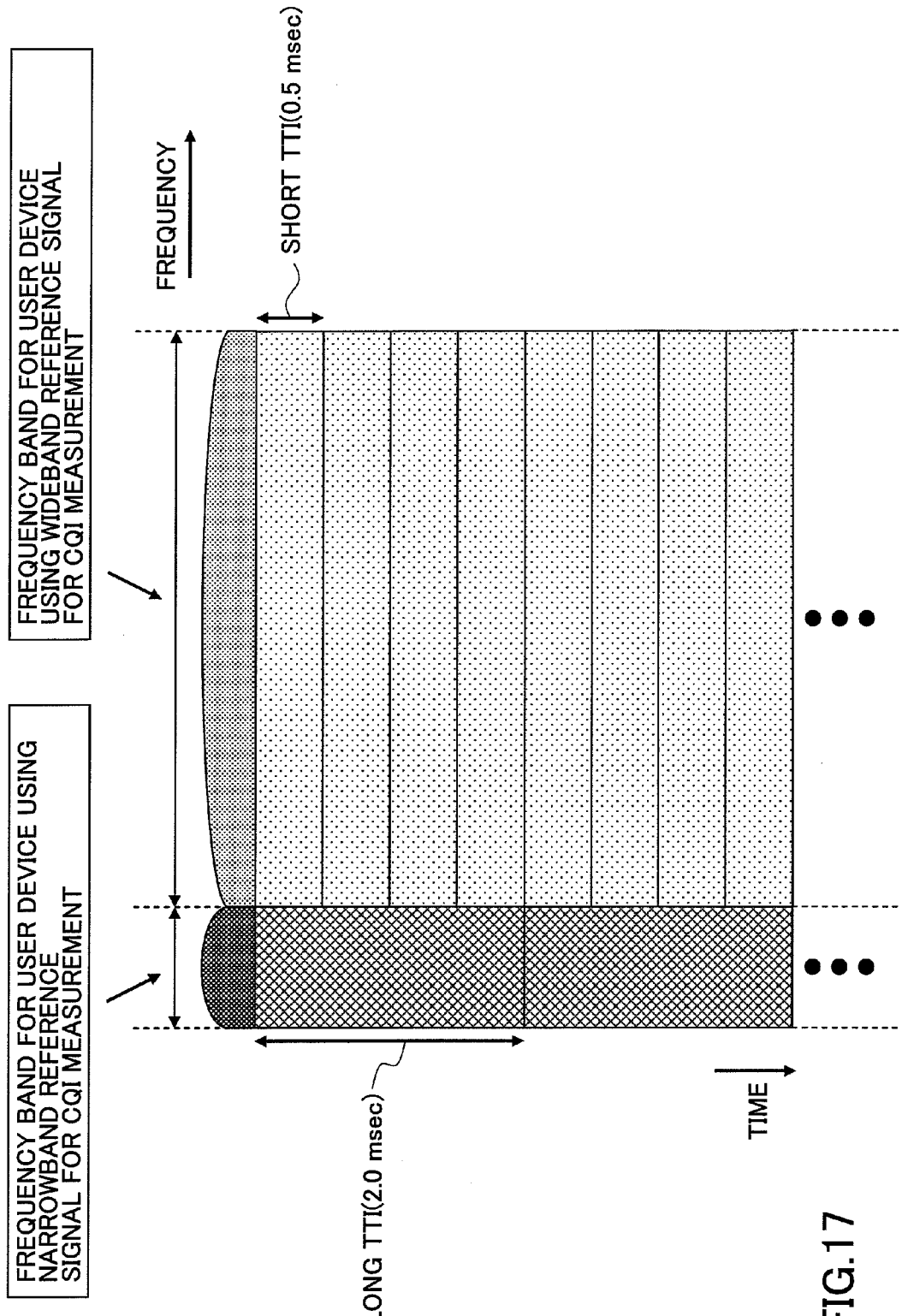
FIG. 17 is a drawing illustrating an example of uplink radio resource allocation.

FIG. 17 is a drawing illustrating an example of uplink radio resource allocation. In FIG. 17, a first resource block using a long TTI (2.0 ms) and having a narrow bandwidth and a second resource block using a short TTI (0.5 ms) and having a wide bandwidth are provided. For example, the first resource block is allocated to a user device whose channel conditions are expected to be comparatively poor and the second resource block is allocated to a user device whose channel conditions are expected to be comparatively good. The channel conditions of user devices can be estimated at the base station based, for example, on uplink CQIs and path losses. The CQI may be represented by the reception quality of a reference signal (pilot channel) received at the base station.

In this example, the first resource block having a narrow bandwidth and the second resource block having a wide bandwidth are frequency-division-multiplexed in one transmission time interval (long TTI). The transmission time interval (2.0 ms) of the first resource block is an integral multiple of the transmission time interval (0.5 ms) of the second resource block. In other words, multiple (four) second resource blocks are time-division-multiplexed in one transmission time interval (long TTI). This scheduling method makes it possible to prevent signal processing from becoming complicated while allowing use of different TTIs for packets.

The present invention is not limited to the specifically disclosed embodiments, and variations and modifications may be made without departing from the scope of the present invention. Although specific values are used in the above descriptions to facilitate the understanding of the present invention, the values are just examples and different values may also be used unless otherwise mentioned. The distinctions between the embodiments are not essential for the present invention, and the embodiments may be used individually or in combination. Although functional block diagrams are used to describe devices in the above embodiments, those devices may be implemented by hardware, software, or a combination of them. The present international application claims priority from Japanese Patent Application No. 2006-225926 filed on Aug. 22, 2006, the entire contents of which are hereby incorporated herein by reference.

The invention claimed is:

1. A radio base station used in a mobile communication system, the radio base station comprising:
   a scheduler configured to allocate one or more resource blocks, which are defined by a predetermined bandwidth and a fixed transmission time interval, to a user device; and
   a reporting unit configured to report scheduling information indicating radio resource allocation to the user device;
   wherein the scheduler is configured to generate the scheduling information such that downlink data channels and downlink control channels are transmitted using the fixed transmission time interval as a transmission unit and uplink control channels are transmitted using an integral multiple of the fixed transmission time interval as a transmission unit, and
   wherein the scheduler is configured to generate the scheduling information such that when one or more of the resource blocks are allocated to the user device for transmission of an uplink data channel, an uplink control channel of the user device is transmitted using a same frequency band as that used for the uplink data channel.

2. The radio base station as claimed in claim 1, wherein the scheduler is configured to generate the scheduling information such that each of the downlink control channels is transmitted using a larger number of the resource blocks if quality of the downlink control channels is expected to be below a predetermined level.

3. The radio base station as claimed in claim 1, wherein the scheduler is configured to adjust a transmission cycle of the downlink data channels in accordance with the transmission unit of the uplink control channels.

4. The radio base station as claimed in claim 1, wherein the scheduler is configured to adjust a downlink data rate for the user device by adjusting the number of the resource blocks to be allocated to the user device in one transmission time interval.

5. The radio base station as claimed in claim 1, wherein the scheduler is configured not to allocate the resource blocks for transmission of uplink data channels of the user device if quality of the uplink control channels of the user device is expected to be below a predetermined level.

6. The radio base station as claimed in claim 1, wherein the radio base station is configured to regularly or irregularly update a value of the integral multiple of the fixed transmission time interval.

7. The radio base station as claimed in claim 6, wherein the value of the integral multiple of the fixed transmission time interval is calculated by the user device.

8. The radio base station as claimed in claim 7, wherein the value of the integral multiple of the fixed transmission time interval is calculated based on transmission power and a path loss of the user device.

9. The radio base station as claimed in claim 6, wherein the radio base station is configured to calculate the value of the integral multiple of the fixed transmission time interval based on reception quality of an uplink control channel.

10. The radio base station as claimed in claim 1, wherein retransmission control of downlink data channels is performed based on an asynchronous hybrid automatic repeat request method.

11. The radio base station as claimed in claim 1, wherein retransmission control of uplink data channels is performed based on a synchronous hybrid automatic repeat request method.

12. The radio base station as claimed in claim 1, wherein the scheduler is configured to adjust a proportion of a control channel in one or more of the resource blocks allocated for transmission of an uplink data channel according to channel conditions of the user device.

13. The radio base station as claimed in claim 1, wherein the scheduler is configured to generate the scheduling information such that resource blocks with different bandwidths and different transmission periods are allocated to multiple user devices in one transmission time interval.

14. The radio base station as claimed in claim 13, wherein the scheduler is configured to generate the scheduling information where a first resource block having a narrower bandwidth and a second resource block having a wider bandwidth are frequency-division-multiplexed and a transmission period of the first resource block is an integral multiple of a transmission period of the second resource block.

15. A method used in a radio base station of a mobile communication system, the method comprising the steps of:
   performing scheduling to allocate one or more resource blocks, which are defined by a predetermined bandwidth and a fixed transmission time interval, to a user device; and
   reporting scheduling information indicating radio resource allocation to the user device;
   wherein the scheduling information is generated such that downlink data channels and downlink control channels are transmitted using the fixed transmission time interval as a transmission unit and uplink control channels are transmitted using an integral multiple of the fixed transmission time interval as a transmission unit, and
   wherein the scheduling information is generated such that when one or more of the resource blocks are allocated to the user device for transmission of an uplink data channel, an uplink control channel of the user device is transmitted using a same frequency band as that used for the uplink data channel.

16. A user device used in a mobile communication system, the user device comprising:
   a receiving unit configured to receive a control channel including scheduling information indicating radio resource allocation; and
   a transmitting unit configured to transmit an uplink control channel alone or a combination of the uplink control channel and an uplink data channel using one or more resource blocks, which are defined by a predetermined bandwidth and a fixed transmission time interval, according to the scheduling information;

wherein the scheduling information is generated such that downlink data channels and downlink control channels are transmitted using the fixed transmission time interval as a transmission unit and uplink control channels are transmitted using an integral multiple of the fixed transmission time interval as a transmission unit, and wherein the scheduling information is generated such that when one or more of the resource blocks are allocated to the user device for transmission of an uplink data channel, an uplink control channel of the user device is transmitted using a same frequency band as that used for the uplink data channel.

17. A method used in a user device of a mobile communication system, the method comprising the steps of:

receiving a control channel including scheduling information indicating radio resource allocation; and transmitting an uplink control channel alone or a combination of the uplink control channel and an uplink data channel using one or more resource blocks, which are defined by a predetermined bandwidth and a fixed transmission time interval, according to the scheduling information;

wherein the scheduling information is generated such that downlink data channels and downlink control channels are transmitted using the fixed transmission time interval as a transmission unit and uplink control channels are transmitted using an integral multiple of the fixed transmission time interval as a transmission unit, and wherein the scheduling information is generated such that when one or more of the resource blocks are allocated to the user device for transmission of an uplink data channel, an uplink control channel of the user device is transmitted using a same frequency band as that used for the uplink data channel.

* * * * *